(12) United States Patent
Spradling et al.

(10) Patent No.: US 8,034,266 B2
(45) Date of Patent: Oct. 11, 2011

(54) CARBON FOAM FROM METALLIC SALTS OF LIGNOSULFONATES

(75) Inventors: Drew M. Spradling, Wheeling, WV (US); Doug R. Amie, Adeno, OH (US)

(73) Assignee: Touchstone Research Laboratory, Ltd., Triadelphia, WV (US)

( * ) Notice: Subject to any disclaimer, the term of this patent is extended or adjusted under 35 U.S.C. 154(b) by 1051 days.

(21) Appl. No.: 10/909,832

(22) Filed: Aug. 3, 2004

(65) Prior Publication Data

US 2005/0085372 A1 Apr. 21, 2005

Related U.S. Application Data

(60) Provisional application No. 60/492,304, filed on Aug. 5, 2003.

(51) Int. Cl.
  *C01B 31/00* (2006.01)
  *C01B 31/02* (2006.01)
  *B29C 65/00* (2006.01)
  *B29C 44/34* (2006.01)
  *B29C 44/46* (2006.01)
  *C08J 9/14* (2006.01)
  *B32B 9/00* (2006.01)

(52) U.S. Cl. ............ 264/29.6; 264/29.4; 264/29.7; 264/41; 264/51; 264/53; 423/445 R; 428/408

(58) Field of Classification Search ............. 106/122; 264/29.4, 29.6, 29.7, 41, 51, 53; 423/445 R; 428/408
See application file for complete search history.

(56) References Cited

U.S. PATENT DOCUMENTS

| | | | | |
|---|---|---|---|---|
| 3,894,878 A | * | 7/1975 | Mansmann et al. | 106/122 |
| 5,426,006 A | * | 6/1995 | Delnick et al. | 429/221 |
| 6,126,874 A | * | 10/2000 | Dillon et al. | 264/29.7 |

* cited by examiner

*Primary Examiner* — David M. Brunsman
*Assistant Examiner* — Kevin Johnson
(74) *Attorney, Agent, or Firm* — Philip D. Lane

(57) ABSTRACT

A process for the production of an open-cell carbon foam from a metallic salt of a lignosulfonate is described. The process includes heating the metallic salt of a lignosulfonate from ambient temperature to a maximum temperature, greater than about 250° C., at a rate sufficiently slow as to provide for essentially uniform heating of the lignin derived material. Heating of the lignin derived material is performed in a non-oxidizing atmosphere having a pressure greater than about 100 psig. The resultant carbon foam can subsequently be optionally subjected to carbonization or graphitization temperatures as desired. The resultant carbon foam has a regular open-cell structure. Densities of the carbon foam products are commonly in the range of about 0.1 g/cm³ to 0.2 g/cm³. The carbon foams may also exhibit compressive strengths of up to about 200 psi. The carbon foam materials potentially have utility as lightweight thermal barriers and in many other of the applications associated with carbon foams.

10 Claims, No Drawings

CARBON FOAM FROM METALLIC SALTS OF LIGNOSULFONATES

CROSS-REFERENCE TO RELATED APPLICATION

This patent application is based on and claims priority to U.S. Provisional Patent Application 60/492,304 filed on Aug. 5, 2003 entitled "Carbon Foam from Lignin" specifically incorporated herein by reference in its entirety.

FIELD OF THE INVENTION

The present invention relates to a process for production of carbon foam from the metallic salts of lignosulfonates.

BACKGROUND OF THE INVENTION

Carbon foams are materials of very high carbon content that have appreciable void volume. In appearance, excepting color, carbon foams resemble readily available commercial plastic foams. As with plastic foams, the void volume of carbon foams is located within numerous empty cells. The boundaries of these carbon foam cells are defined by the carbon structure. These cells typically approximate ovoids of regular, but not necessarily uniform, size, shape, distribution, and orientation. The void volumes in these cells typically connects to neighboring void volumes. Such an arrangement is referred to as an open-cell foam. The carbon in these foams forms a structure that is continuous in three dimensions across the material. Typically, the cells in carbon foams are of a size that is readily visible to the unaided human eye. Also, the void volume of carbon foams is such that it typically occupies much greater than one-half of the carbon foam volume.

The regular size, shape, distribution, and orientation of the cells within carbon foam readily distinguishes this material from other materials such as metallurgical cokes. The void volumes within cokes are typically of ovoid shape and of random size, distribution, and orientation. That is, in cokes, some readily visible void volumes can be an order of magnitude, or more, larger than others. It is also not uncommon that the over-lapping of void volumes in cokes results in significant distortions in the void volume shape. These distortions and large void volumes can even lead to a product that has limited structural integrity in all except smaller product volumes. That is, it is not uncommon for coke to be friable and larger pieces of coke to readily break into smaller pieces with very minimal handling. Such breakage is not exhibited by carbon foams. Also, a given sample of coke can exhibit both open and closed-cell void volumes.

Carbon foams have potential utility in a variety of applications as a result of their unique properties such as temperature resistance, strength, and low density. For example, carbon foams can exhibit significant strength, even at extreme temperatures, which makes these materials suitable for use as lightweight thermal barriers, wall panels, and as baffles for high intensity flames. These materials can also function as filter media for the removal of gross solid contaminates from molten metals.

Numerous examples of carbon foams have been produced from various pitches, foamed synthetic plastics, coals, and coal extracts. The resulting carbon foams from each type of feed-stock material exhibit individual properties that make the use of such foams particularly advantageous or disadvantageous in certain applications. For example, pitches (whether they are derived from petroleum or coal) have been shown to produce carbon foams with excellent thermal conductivity but poor mechanical integrity. Coal based foams have excellent mechanical strength, but can sometimes lack the highly ordered crystal structure which is usually associated with high thermal conductivity. Pitch based carbon foams are highly pure due to the extensive processing of the starting raw material that is required. This extensive processing also leads to very high raw material costs, which in turn limits the potential market for the end product.

It would be advantageous to produce a carbon foam that exhibits relatively low density coupled with high strength. It would be further advantageous if such a foam exhibited at least partially the highly ordered crystal structure which is usually associated with high thermal conductivity.

SUMMARY OF THE INVENTION

The present invention provides a process for the production of an open-cell carbon foam from a metal salt of a lignosulfonate. According to an embodiment of the invention, the process includes heating a metallic salt of a lignosulfonate from ambient temperature to a maximum temperature, greater than about 250° C., at a rate sufficiently slow as to provide for essentially uniform heating of the lignosulfonate material. Such heating rates are typically greater than about 0.5° C./minute and less than about 5° C./minute. All heating of the lignosulfonate material may be performed in a non-oxidizing atmosphere. The pressure of this non-oxidizing atmosphere is preferably greater than about 100 psig. This pressurized non-oxidizing atmosphere is established prior to or during the initial heating of the lignosulfonate material to the maximum temperature of greater than about 250° C. The lignosulfonate material is maintained at temperatures greater than about 250° C. and less than or equal to the maximum temperature for a time period greater than about 30 minutes and typically less than about 6 hours resulting in the carbon foam product of an embodiment of the invention. Maximum temperatures of up to 500° C. have been found to be useful in the practice of the present invention. It is expected temperatures higher than 500° C. can also be used. Similarly, non-oxidizing atmosphere pressures of up to 500 psig have been found to be useful in the practice of the present invention. It is expected pressures higher than about 500 psig can also be used.

Optionally, following heating for a time period at a temperature greater than about 250° C., the resulting carbon foam is cooled to minimally about 100° C. at a rate sufficiently slow as to prevent cracking of the carbon foam due to thermally induced stresses caused by non-uniform cooling of the carbon foam. Such a cooling rate may be less than about 20° C./min. The pressure of the atmosphere over the carbon foam can be reduced to about 0 psig before, during, or preferably, after cooling. Optionally, the resultant carbon foam may be subsequently heated, under a non-oxidizing, or otherwise non-reactive atmosphere, to selected temperatures as high as about 3000° C. to further improve selected properties of the carbon foam. Cooling of the carbon foam, from these temperatures, should be at a rate sufficiently slow as to prevent cracking of the carbon foam due to thermally induced stresses caused by non-uniform cooling of the carbon foam.

In another embodiment of the invention, the carbon foam has a regular open-cell structure with densities typically ranging from about 0.1 g/cm$^3$ to 0.2 g/cm$^3$. Higher or lower densities may be achievable, dependent on the specific properties of the lignosulfonate material subjected to the process of the invention and the manner in which the process is performed. After calcination at about 1050° C., the foams may also exhibit compressive strengths of up to at least about 200 psi. This carbon foam material potentially has utility as lightweight thermal barriers and in many other of the applications associated with carbon foams.

DETAILED DESCRIPTION OF THE INVENTION

The present invention provides a process for the production of an open-cell carbon foam from a metallic salt of a lignisulfonate (herein after also referred to as a lignosulfonate material). The process entails heating the lignosulfonate material from ambient temperature to a maximum temperature of greater than about 250° C., at a rate sufficiently slow as to provide for essentially uniform heating of the lignosulfonate material. All heating of the lignosulfonate material is performed in an essentially non-oxidizing atmosphere. The pressure of this essentially non-oxidizing atmosphere is preferably greater than about 100 psig. The lignosulfonate material is maintained at temperatures greater than about 250° C. and less than or equal to the maximum temperature for a time period greater than about 30 minutes and typically less than about 6 hours to result in the carbon foam product of the present invention.

Optionally, following this time period, the resultant carbon foam may be cooled to minimally about 100° C. at a rate sufficiently slow as to prevent cracking of the carbon foam due to thermally induced stresses caused by non-uniform cooling of the carbon foam. The pressure of the non-oxidizing atmosphere over the resultant carbon foam may be reduced to about 0 psig before, during, or preferably, after cooling.

The resultant carbon foam may be washed with water, aqueous acids, bases, and/or other solutions to reduce the amount of inorganic materials, if any, in the carbon foam. The foam may be dried after such washing by the use of conventional methods.

The resultant carbon foam can be subsequently heated, under a non-oxidizing or otherwise inert atmosphere, to selected elevated temperatures as high as about 3000° C. Such heating can result in the improvement of selected properties of the carbon foam. Heating and cooling of the carbon foam, to and from these temperatures, should be at a rate sufficiently slow as to prevent cracking of the carbon foam due to thermally induced stresses caused by non-uniform heating or cooling of the carbon foam.

Metallic salts of lignosulfonates may include, but are not limited to, calcium salts of lignosulfonates, sodium salts of lignosulfonates, and potassium salts of lignosulfonates. Metallic salts of lignosulfonates are typically commercially available and are commonly available in powder form. In certain embodiments, calcium salts of lignosulfonates (i.e. calcium lignosulfonates) may be used in the practice of the present invention to form carbon foam.

Such lignosulfonate materials provide the only known renewable resource that may be used for carbon foam production. Lignosulfonates are typically byproducts of the paper manufacturing process, wherein the lignin is removed from wood pulp, typically as a lignin derivative, leaving cellulose behind. The cellulose is then used for paper production. Such lignin derivatives are commonly used in many industries for binding and lubricating purposes. These derivatives are typically environmental friendly, and some are used in animal feeds.

Heating of the lignosulfonate material to form the carbon foam of the present invention may be accomplished by use of a vessel, similar to an autoclave, designed to tolerate the pressure and temperature maximums of the process. The lignosulfonate material can be directly placed within the vessel or placed within a container which is then subsequently placed within the vessel. The container is preferably equipped with a loose fitting lid. A lidded container is believed to improve the contact of the lignosulfonate material with the lignosulfonate material-derived volatile material, which in turn improves the properties of the resultant carbon foam. Such a container may also be used to localize the lignosulfonate material within the vessel and to direct and control the shape of the resulting carbon foam.

The use of a container can also provide for easier removal of the carbon foam from the vessel. The container should be constructed of a material(s) that is compatible with the temperatures, pressures, gases, lignosulfonate material, and lignosulfonate material by-products inherent to the practice of this invention. Additionally, a container may be shaped such that it serves as a mold to result in production of a carbon foam having a desired geometric shape and size. If such a mold is prepared, allowances in the dimensions of the mold should be made to compensate for the shrinkage of the carbon foam with cooling and or exposure to other, higher temperatures. Precise values for the degree of shrinkage can be readily obtained by routine experimentation. It is expected that the amount of shrinkage may be reduced by the addition of inert solid materials, such as coke particles, ceramic particles, foam waste, and so forth to the lignosulfonate material prior to heating. Similar techniques are sometimes practiced in ceramic fabrication.

As with the container, the heating vessel should be compatible with the temperatures and pressures used in the practice of this invention. This vessel should also be impervious to significant corrosion from any of the volatile gaseous materials evolved from the lignosulfonate material. Additionally, the vessel should have sufficient internal volume to provide for the production of carbon foams of the desired size.

A sufficient amount of lignosulfonate material should be used to provide a uniform layer on the bottom of the container or vessel. For a given set of processing conditions, the thickness of the resultant carbon foam product is directly related to the thickness of this lignosulfonate material layer. Minimally the lignosulfonate material powder layer should be sufficiently thick as to provide for intimate interparticle contact. A thickness of minimally about one-quarter inch usually provides for the production of a carbon foam.

The non-oxidizing atmosphere for production of the resultant carbon foam may include any essentially inert gas, such as nitrogen, helium, carbon dioxide, argon, and the like, or mixtures thereof. The non-oxidizing atmosphere can be initially established in the vessel by the addition of such essentially inert gases to the vessel. As the temperature of the lignosulfonate material within the vessel is increased, the lignosulfonate material will emit gaseous constituents that include a variety of hydrocarbon compounds. The presence of these hydrocarbon compounds in the atmosphere is thought to be beneficial to the preparation of the carbon foam. Therefore, establishment of any excessive gas flow through the vessel, or venting of the vessel, during production of the carbon foam is discouraged. Even with this discouragement, sometimes the gas pressure in the vessel may have to be adjusted to lower values, or adjusted in order to maintain a predetermined maximum value, by intermittent venting of the vessel. Although such adjustments can not usually be avoided during the production of carbon foam, the effect of these adjustments should be minimized. One method to minimize such adjustments is to pressurize the vessel, prior to the heating of the vessel, to some value significantly less than the desired maximum pressure. As the temperature of the vessel is increased, the combination of thermally induced gas expansion and gas emission from the lignin derived material will serve to increase the pressure within the vessel to the desired value.

In certain embodiments, the minimum pressure of the non-oxidizing atmosphere within the vessel should be greater that about 100 psig. The maximum pressure of the non-oxidizing atmosphere within the vessel can be as great as about 500 psig. It is expected that pressures higher than about 500 psig can be used. Preferably, the pressure is held relatively constant throughout the carbon foam forming process. Generally, a higher atmospheric pressure within the vessel is expected to result in a carbon foam having increased density coupled with a decrease in cell size.

In certain embodiments, the maximum temperature to which the lignosulfonate material is heated is greater than about 250° C. and typically less than about 500° C. It is expected that maximum temperatures greater than about 500° C. can be used. It is generally desirable that the maximum temperature be of sufficient magnitude as to prevent condensation of any volatiles resulting from the conversion of the lignosulfonate material into carbon foam. Selection of a maximum temperature is dependent on the properties of the specific lignosulfonate material selected for processing into a carbon foam. Routine experimentation can readily identify a suitable maximum temperature for a given lignosulfonate material starting material.

The lignosulfonate material sample can be heated to a maximum temperature of greater than about 250° C. at the highest rate at which the lignosulfonate material sample temperature remains relatively uniform. Heating the lignosulfonate material sample to temperatures greater than about 250° C. may generally be performed at a rate greater than about 0.5° C./min and less than about 50° C./minute. Typically, as the heating rate to maximum temperatures greater than about 250° C. increases, the carbon foam cell size increases.

Once the maximum temperature is achieved, the vessel and lignosulfonate material are maintained at a temperature greater than about 250° C. and less than or equal to the maximum temperature for a time period greater than about 30 minutes and typically less than about 6 hours. At the end of this time period, the carbon foam product has been produced. Carbon foam cell size is not significantly affected by the length of this time period. The length of this time period, sometimes referred to as a "soak time", may, however, affect the density, strength, and other selected properties of the carbon foam.

Therefore it is apparent then that the properties of the resultant carbon foam are significantly dependent on the heating rate, the maximum temperature, soak time, and the pressure of the atmosphere within the vessel. Therefore, these process variables can be effectively manipulated within the limits of the present invention to provide carbon foam products having a range of properties such a cell size, density, and strength.

At the end of the soak time, the pressure in the vessel can be adjusted to ambient. This adjustment can be before or after the carbon foam and vessel have cooled. Adjustment after cooling of the vessel and carbon foam may result in additional organic volatile material interacting with the carbon foam during an extended cooling time period. Such interaction may prove beneficial to the resultant carbon foam properties. Alternatively, the pressure in the vessel can be adjusted to ambient pressure, or any pressure between ambient and the maximum pressure, at any time following the "soak time".

Cooling of the carbon foam is preferably conducted in a non-oxidizing atmosphere until the temperature of the carbon foam is less than about 100° C. Additionally, to avoid cracking of the carbon foam due to uneven thermal contraction, larger pieces of the carbon foam should preferably be cooled at a rate of less that about 20° C./minute to a temperature of less than about 100° C.

Once prepared, the carbon foam may be exposed to elevated temperatures as great as 3000° C. Heating to elevated temperatures of less than about 1600° C. can be referred to as carbonization or calcination. Heating to elevated temperatures of greater than about 1600° C. can be referred to as graphitization.

Such exposure is usually performed under a non-oxidizing or otherwise inert (i.e. non-reactive) atmosphere. The non-oxidizing or otherwise inert atmosphere under which the carbon foam is optionally heated to selected elevated temperatures may be comprised of any of a number of non-oxidizing or otherwise non-reactive gases or combinations of those gases. The inclusion of a gas in such an atmosphere is dependent on the temperature to which the carbon foam and atmosphere will be exposed. For example, carbon dioxide is suitable for those temperatures less than about 650° C. Nitrogen is suitable for temperatures less than about 1200° C. Helium, neon, and argon are suitable for temperatures up to and including 3000° C. Such heating to elevated temperatures can reduce the volatile material content of the carbon foam and further improve selected foam properties such as electrical conductivity, thermal conductivity, and strength. Additionally, heating to temperatures greater than about 1600° C. may alter the carbon structure of the carbon foam into a more ordered structure. Such a more ordered structure may have increased levels of crystallinity and be more graphite-like (i.e. graphitic).

The initial exposure of carbon foam to temperatures higher than the maximum temperature at which the foam was produced results in shrinkage of the foam. This shrinkage is a result of the chemical condensation of the carbon structures which comprise the foam. For any exposure to high temperatures, the carbon foam should preferably be maintained in an inert or otherwise non-reactive atmosphere, whenever possible, to prevent degradation. Heating rates to and minimum residence time at the maximum selected temperature (for thermal equilibrium within the carbon foam piece) are generally dependent on the size and shape of the carbon foam piece. Heating, and cooling, rates should be selected such that the carbon foam internal temperature is relatively uniform throughout the piece and the foam is not cracked as a result of significantly unequal temperature regions within the carbon foam piece. Such unequal regions can produce internal stress which can crack, break, or otherwise fragment the carbon foam. Such cracking and similar breakage can be referred to as "thermal stress breakage". Minimum residence times at the maximum selected temperature should be long enough to permit thermal equilibrium to be essentially achieved within the carbon foam piece. Maximum heating and cooling rates and minimum residence times are best determined experimentally in most cases, using techniques familiar to those skilled in the associated arts.

The carbon foams produced by use of the method of this invention, when carbonized at 1050° C., typically have densities of about 0.1 g/cm$^3$. These carbon foams can also exhibit tensile strengths of between about 100 and about 500 psi. For example, following carbonization at about 1050° C., carbon foams of the present invention having densities of about 0.1 g/cm$^3$ (about 7 lbs/ft$^3$) can exhibit compressive strengths from about 200 psi.

Impregnation of the carbon foam with appropriate materials or the incorporation of various strength-improving additives to the lignosulfonate material prior to processing may further increase the compressive, tensile, and other properties of these carbon foams. Such impregnation, with or without fillers, could be with various pitches, thermoplastic resins, thermosetting resins, and similar materials. Strength improving additives could include ceramic or carbon particles, fibers, plates, and the like.

In appearance, the carbon foams of the present invention are hard, black, relatively low density materials. As produced, these foams have a randomly textured, relatively smooth surface. The smooth surface of these as-produced foams is thought to be a result of volatile material deposition during processing. In cross section, a regular, small, variance in cell size may be observed between the interior and edges of the foam. As produced, the carbon foam is open-cell and readily formed to desired shapes by conventional material-removal/size reduction techniques such as milling, sawing, grinding, sanding and so forth. Pieces of the carbon foam can also be readily joined by use of adhesives.

The following example is provided for the purposes of illustration only and is not intended to limit the scope of the present invention in any way.

EXAMPLE

The following Example illustrates a method in accordance with an embodiment of the invention for preparing carbon foam from a metallic salt of a lignosulfonate, in this case a calcium lignosulfonate.

A quantity of a calcium lignosulfonate, in a container, was sealed in a pressure vessel which was subsequently pressurized to about 400 psig with nitrogen. The vessel, and contained calcium lignosulfonate, were then heated from room temperature to about 500° C. at a rate of about 2.5° C./min to product a carbon foam. Following this heating, the vessel, and resultant carbon foam, were cooled to about 250° C. over a time period of greater than about 180 minutes. The vessel and resultant carbon foam were then cooled to less than about 100° C. Subsequent to this cooling, the pressure vessel was vented to ambient atmospheric pressure. The resultant carbon foam exhibited a density of about 9 lb/ft$^3$ (about 0.14 g/cm$^3$). Calcination of the resultant carbon foam at 1050° C. resulted in a carbon foam exhibiting a density of about 7 lb/ft$^3$ (about 0.11 g/cm$^3$).

What is claimed is:

1. A method for producing an open-cell carbon foam from a metallic salt of a lignosulfonate comprising the steps of: forming a foam by heating an amount of a metallic salt of a lignosulfonate to a first maximum temperature of greater than about 250° C. in a substantially non-oxidizing atmosphere, at a pressure of greater than about 100psig; and maintaining said metallic salt of a lignosulfonate at temperatures greater than about 250° C. and not greater than said first maximum temperature for a time period effective to result in an open-cell carbon foam.

2. The method of claim 1, further comprising the step of: cooling said carbon foam to a temperature less than about 100° C. at a rate of less than about 20° C/min.

3. The method of claim 2, further comprising the step of: heating said carbon foam to a second maximum temperature less than or equal to about 3000° C., and then cooling said carbon foam to less than 100° C., in a non-reactive atmosphere.

4. The method of claim 1, further comprising the step of: heating said carbon foam to a second maximum temperature less than or equal to about 3000° C., and then cooling said carbon foam to less than 100° C., in an non-reactive atmosphere.

5. The method of claim 1, wherein said heating of said metallic salt of a lignosulfonate is conducted at a rate of greater than 0.5° C/minute and less than about 5° C/minute.

6. The method of claim 1, wherein said first maximum temperature is greater than about 250° C. and less than about 500° C.

7. The method of claim 1, wherein said metallic salt of a lignosulfonate is calcium lignosulfonate.

8. The method of claim 1, wherein said metallic salt of a lignosulfonate is sodium lignosulfonate.

9. The method of claim 1, wherein said metallic salt of a lignosulfonate is potassium lignosulfonate.

10. The method of claim 1, further comprising the step of washing said carbon foam with at least one selected from the group consisting of water, an aqueous base, an aqueous acid, and an aqueous solution.

* * * * *